United States Patent [19]
Lee

[11] Patent Number: 5,721,697
[45] Date of Patent: Feb. 24, 1998

[54] PERFORMING TREE ADDITIONS VIA MULTIPLICATION

[75] Inventor: Ruby Bei-Loh Lee, Los Altos Hills, Calif.

[73] Assignee: Hewlett-Packard Company, Palo Alto, Calif.

[21] Appl. No.: 649,349

[22] Filed: May 17, 1996

Related U.S. Application Data

[60] Provisional application No. 60/000,272, Jun. 16, 1995.
[51] Int. Cl.$^6$ .................... G06F 7/50; G06F 7/52
[52] U.S. Cl. ............... 364/754; 364/758; 364/784; 364/786
[58] Field of Search .................... 364/754, 757, 364/758, 759, 760, 768, 784, 786

[56] References Cited

U.S. PATENT DOCUMENTS 4,369,500  1/1983  Fette ................................. 364/758
4,736,335  4/1988  Barkan .............................. 364/758
5,095,457  3/1992  Jeong ............................... 364/758

*Primary Examiner*—Chuong Dinh Ngo

[57] ABSTRACT

A multiplier is modified to perform a tree addition. A first value is input to the multiplier in place of a first multiplicand. The first value is a concatenation of addends upon which the tree addition is performed. A second value is input into the multiplier in place of a second multiplicand. Each bit of the second value is at logic zero except for a first subset of bits. The first subset of bits are bits of the second value, starting with the low order bit, which are at intervals equal to a bit length of each addend. Each of the first subset of bits is set to logic one. In partial product rows in the multiplier which correspond to the first subset of bits, certain partial products are forced to logic zero. This is done in such a way that all the addends for the tree addition are aligned in columns of the multiplier. The partial products are then summed to produce a result.

16 Claims, 4 Drawing Sheets

PERFORMING TREE ADDITIONS VIA MULTIPLICATION

CROSS REFERENCE TO RELATED APPLICATION

This application is based on provisional application Ser. No. 60/000,272, filed Jun. 16, 1995.

BACKGROUND

The present invention concerns computer operations implemented in hardware and particularly hardware which performs tree additions.

In computer systems one or more arithmetic logic units (ALUs) are generally utilized to perform arithmetic operations. In addition to ALUs, high performance computing often include other special hardware to expedite the performance of specific tasks. For example, a computing system may include hardware devoted to performing multiplication and/or hardware devoted to performing division.

Complex operations for which there is no devoted hardware are generally implemented by a series of instructions. For example, a tree add operation is useful for video compression. In one case of a tree add instruction, four sixteen-bit half words originally in a single sixty-four bit register are added together. In another case of a tree add instruction, eight bytes originally in a single sixty-four bit register are added together. In another case of a tree add instruction, four bytes originally in a single thirty-two bit register are added together. And so on.

In order to perform a tree add instruction, it is generally required to place each operand in a separate register and then, to successively use the add operation implemented by the ALU to add operands together, two at a time. As will be understood, such an execution of a tree add instruction will generally take a large number of instruction cycles. As long as tree additions are rare, this is not a significant hindrance to high performance in a computing system. However, for a computing system which frequently performs tree additions, for example for video compression, implementing the tree add using a large number of instruction cycles could have a negative impact on overall system performance.

SUMMARY OF THE INVENTION

In accordance with the preferred embodiment of the present invention, a multiplier is modified to perform a tree addition. A first value is input to the multiplier in place of a first multiplicand. The first value is a concatenation of addends upon which the tree addition is performed. A second value is input into the multiplier in place of a second multiplicand. Each bit of the second value is at logic zero except for a first subset of bits. The first subset of bits are bits of the second value, starting with the low order bit, which are at intervals equal to a bit length of each addend. Each of the first subset of bits is set to logic one. In partial product rows in the multiplier which correspond to the first subset of bits, certain partial products are forced to logic zero. This is done in such a way that all the addends for the tree addition are aligned in columns of the multiplier. The partial products are then summed to produce a result.

In the preferred embodiment, the partial products are generated using three-input logic AND gates. Particular partial products are forced to zero by placing a zero on a control input of the three-input logic AND gate used to generate the partial product.

Also, in the preferred embodiment, the partial products are summed in two steps. In a first step, the partial products are reduced into two rows of partial products. A carry propagate addition is then performed on the two rows of partial products to produce the result.

The present invention allows for a implementation of a tree addition with only minor changes to a multiplier.

DESCRIPTION OF THE PRIOR ART

Figure 1:
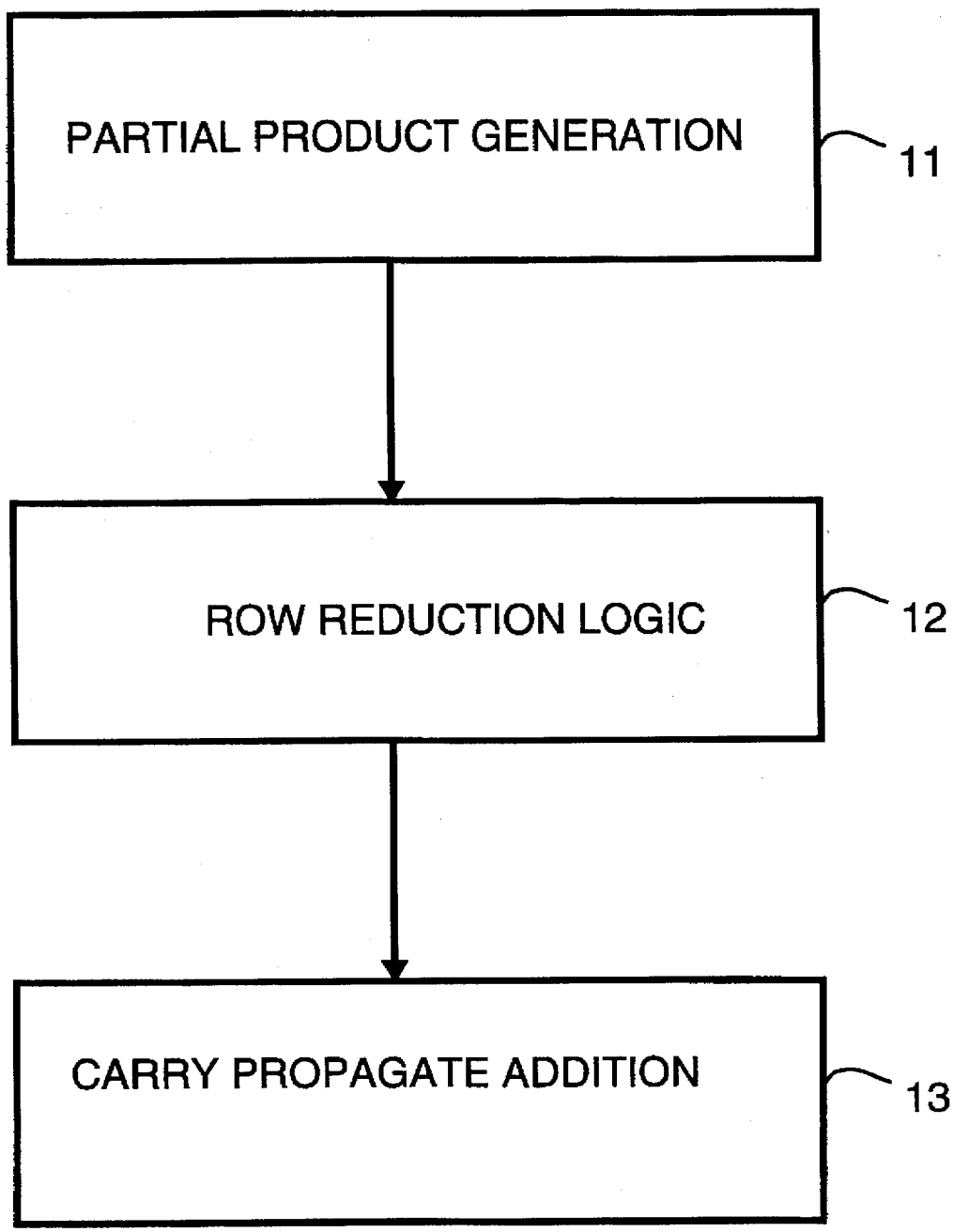
FIG. 1 shows a simplified block diagram of a multiplier in accordance with the prior art.

FIG. 1 shows a block diagram of an integer or mantissa multiplier. Partial product generation logic 11 generates rows of partial products. Row reduction logic 12 uses three-to-two counters to reduce the rows of partial products to two rows. A three-to-two counter is implemented using a one-bit adder slice which adds three one-bit inputs to produce a two-bit output. Carry propagate addition logic 13 performs a full carry-propagate add on the two remaining rows to produce a final product.

Figure 2:
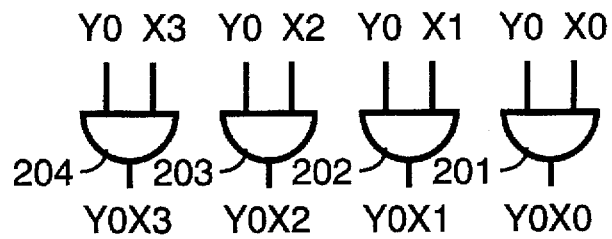
FIG. 2 shows a block diagram of a multiplier in accordance with the prior art.
Figure 2:
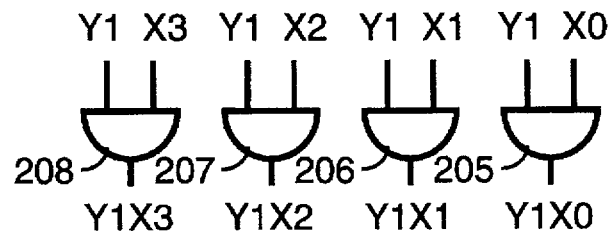
Figure 2:
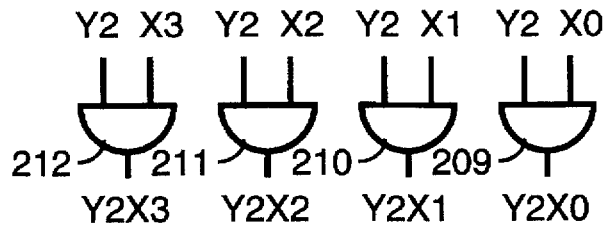
Figure 2:
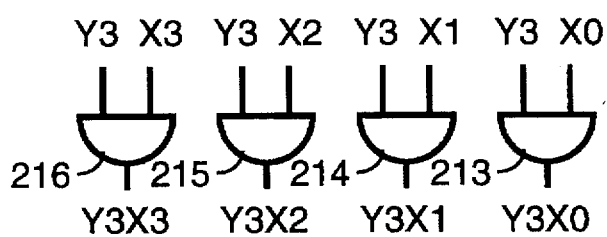
Figure 2:
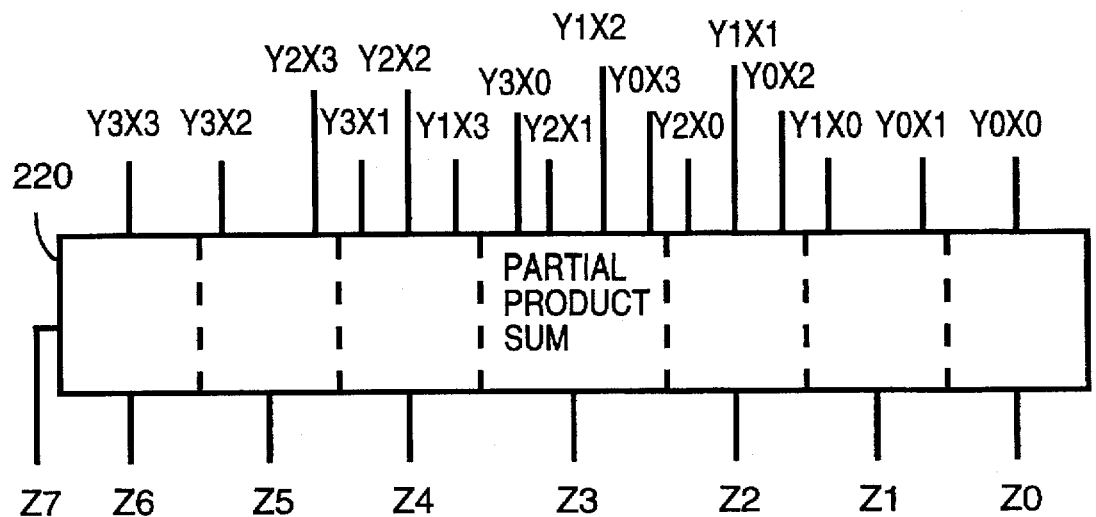

FIG. 2 shows a four-bit multiplier in accordance with the prior art. The multiplier multiplies a four-bit first multiplicand $X_3X_2X_1X_0$ (base 2) with a four-bit second multiplicand $Y_3Y_2Y_1Y_0$ (base 2) to produce an eight-bit result $Z_7Z_6Z_5Z_4Z_3Z_2Z_1Z_0$ (base 2). As is understood by those skilled in the art, logic AND gates 201, 202, 203, 204, 205, 206, 207, 208, 209, 210, 211, 212, 213, 214, 215 and 216 may be used to generate partial products for the multiplication. A partial product sum circuit 220 sums the partial products generated by logic AND gates 201 through 216 to produce the result. Partial product sum circuit includes both reduction logic and carry propagate addition logic, as described above.

The two multiplicands, $X_3X_2X_1X_0$ and $Y_3Y_2Y_1Y_0$, the partial products generated by logic AND gates 201 through 216, and the result produced by partial product sum circuit 220 may be placed in a table in such a way as to summarize operation of the multiplier. For example, such a table is shown as Table 1 below:

TABLE 1

|   |   |   |   | $X_3$ | $X_2$ | $X_1$ | $X_0$ |   |
|---|---|---|---|---|---|---|---|---|
|   |   |   |   |   |   |   |   |   |
|   |   |   |   | $Y_0X_3$ | $Y_0X_2$ | $Y_0X_1$ | $Y_0X_0$ | $Y_0$ |
|   |   |   | $Y_1X_3$ | $Y_1X_2$ | $Y_1X_1$ | $Y_1X_0$ |   | $Y_1$ |
|   |   | $Y_2X_3$ | $Y_2X_2$ | $Y_2X_1$ | $Y_2X_0$ |   |   | $Y_2$ |
|   | $Y_3X_3$ | $Y_3X_2$ | $Y_3X_1$ | $Y_3X_0$ |   |   |   | $Y_3$ |
| $Z_7$ | $Z_6$ | $Z_5$ | $Z_4$ | $Z_3$ | $Z_2$ | $Z_1$ | $Z_0$ |   |

In the notation used in Table 1 above, the bit position of each bit of both multiplicands and the result is specifically identified. Additionally, the bits of the multiplicand which are used to form each partial product are specifically set out. As is understood by those skilled in the art, the information shown in Table 1 above may be set out using abbreviated or simplified notation, as in Table 2 below:

TABLE 2

|   |   |   |   | $X_3$ | $X_2$ | $X_1$ | $X_0$ |   |
|---|---|---|---|---|---|---|---|---|
|   |   |   |   | $X_3$ | $X_2$ | $X_1$ | $X_0$ | $Y_0$ |
|   |   |   | $X_3$ | $X_2$ | $X_1$ | $X_0$ |   | $Y_1$ |
|   |   | $X_3$ | $X_2$ | $X_1$ | $X_0$ |   |   | $Y_2$ |
|   | $X_3$ | $X_2$ | $X_1$ | $X_0$ |   |   |   | $Y_3$ |
| $Z_7$ | $Z_6$ | $Z_5$ | $Z_4$ | $Z_3$ | $Z_2$ | $Z_1$ | $Z_0$ |   |

In Table 2 above, each row of partial products is shown without the Y component. Thus, the first row of partial products is listed in Table 2 as follows:

$X_3 X_2 X_1 X_0$

However, this is a simplified notation which represents the following partial products:

$Y_0X_3\ Y_0X_2\ Y_0X_1\ Y_0X_0$

Similarly, the last row of partial products listed in Table 2 represents the following partial products:

$Y_3X_3\ Y_3X_2\ Y_3X_1\ Y_3X_0$

Using the simplified notation of Table 2, an eight-bit multiplier may be described as shown in Table 3 below:

DESCRIPTION OF THE PREFERRED EMBODIMENT

Generally, most of the circuitry and execution latency of a multiplier exists in row reduction logic 12 and carry propagate addition logic 13. In the preferred embodiment, no changes are made to row reduction logic 12 or carry propagate additional logic 13 of a multiplier in order to perform a tree addition. But in partial product generation logic 11, the two input logic AND gates are replaced with three input logic AND gates.

Figure 3:
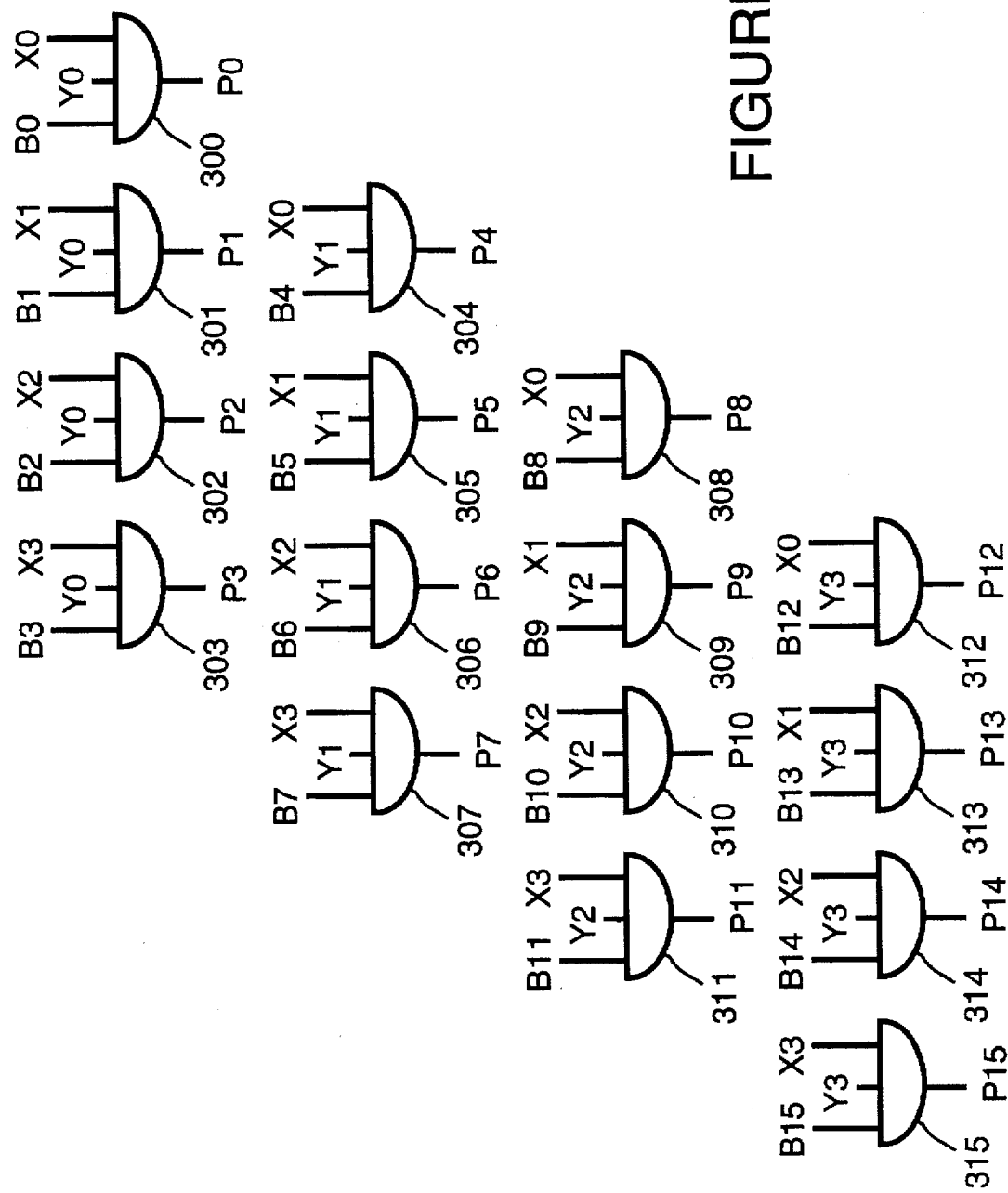
FIG. 3 shows a simplified block diagram of circuitry which generates partial products for a modified multiplier in accordance with the preferred embodiment of the present invention.

FIG. 3 shows that in partial product generation logic 11, the two input logic AND gates are replaced with three input logic AND gates. The multiplier multiplies a four-bit first multiplicand $X_3X_2X_1X_0$ (base 2) with a four-bit second multiplicand $Y_3Y_2Y_1Y_0$ (base 2) to produce an eight-bit result $Z_7Z_6Z_5Z_4Z_3Z_2Z_1Z_0$ (base 2). As is understood by those skilled in the art, logic AND gates 300, 301, 302, 303, 304, 305, 306, 307, 308, 309, 310, 311, 312, 313, 314 and 315 may be used to generate partial products for the multiplication. When generating partial products for multiplication, control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$ are all set to logic 1 in order to generate partial products $P_0$, $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$ and $P_{15}$.

In addition, selection of multiplicands and selection of values of control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$ can be used to perform a tree add as is further described below.

TABLE 3

|   |   |   |   |   |   |   |   | $X_7$ | $X_6$ | $X_5$ | $X_4$ | $X_3$ | $X_2$ | $X_1$ | $X_0$ |   |
|---|---|---|---|---|---|---|---|---|---|---|---|---|---|---|---|---|
|   |   |   |   |   |   |   |   | $X_7$ | $X_6$ | $X_5$ | $X_4$ | $X_3$ | $X_2$ | $X_1$ | $X_0$ | $Y_0$ |
|   |   |   |   |   |   |   | $X_7$ | $X_6$ | $X_5$ | $X_4$ | $X_3$ | $X_2$ | $X_1$ | $X_0$ |   | $Y_1$ |
|   |   |   |   |   |   | $X_7$ | $X_6$ | $X_5$ | $X_4$ | $X_3$ | $X_2$ | $X_1$ | $X_0$ |   |   | $Y_2$ |
|   |   |   |   |   | $X_7$ | $X_6$ | $X_5$ | $X_4$ | $X_3$ | $X_2$ | $X_1$ | $X_0$ |   |   |   | $Y_3$ |
|   |   |   |   | $X_7$ | $X_6$ | $X_5$ | $X_4$ | $X_3$ | $X_2$ | $X_1$ | $X_0$ |   |   |   |   | $Y_4$ |
|   |   |   | $X_7$ | $X_6$ | $X_5$ | $X_4$ | $X_3$ | $X_2$ | $X_1$ | $X_0$ |   |   |   |   |   | $Y_5$ |
|   |   | $X_7$ | $X_6$ | $X_5$ | $X_4$ | $X_3$ | $X_2$ | $X_1$ | $X_0$ |   |   |   |   |   |   | $Y_6$ |
|   | $X_7$ | $X_6$ | $X_5$ | $X_4$ | $X_3$ | $X_2$ | $X_1$ | $X_0$ |   |   |   |   |   |   |   | $Y_7$ |
| $Z_{15}$ | $Z_{14}$ | $Z_{13}$ | $Z_{12}$ | $Z_{11}$ | $Z_{10}$ | $Z_9$ | $Z_8$ | $Z_7$ | $Z_6$ | $Z_5$ | $Z_4$ | $Z_3$ | $Z_2$ | $Z_1$ | $Z_0$ |   |

The multiplier shown in Table 3 multiplies an eight-bit first multiplicand $X_7X_6X_5X_4X_3X_2X_1X_0$(base 2) with an eight-bit second multiplicand $Y_7Y_6Y_5Y_4Y_3Y_2Y_1Y_0$(base 2) to produce an sixteen-bit result $Z_{15}Z_{14}Z_{13}Z_{12}Z_{11}Z_{10}Z_9Z_8Z_7Z_6Z_5Z_4Z_3Z_2Z_1Z_0$(base 2). To further simplify notation, the partial products and the sixteen-bit result may be written without subscripts. Thus, the eight-bit multiplication may be represented as in Table 4 below:

Particularly, when a tree add is to be performed on a plurality of addends within a first register, a first value in the first register is input in place of the first multiplicand for the multiplier. The first value is a concatenation of the addends. A second value is input into the multiplier in place of the second multiplicand. Each bit of the second value is at logic zero except for a first subset of bits. The first subset of bits includes a low order bit of the second value, and includes bits of the second value which, starting from the low order

TABLE 4

|   |   |   |   |   |   |   |   | $X_7$ | $X_6$ | $X_5$ | $X_4$ | $X_3$ | $X_2$ | $X_1$ | $X_0$ |   |
|---|---|---|---|---|---|---|---|---|---|---|---|---|---|---|---|---|
|   |   |   |   |   |   |   |   | X | X | X | X | X | X | X | X | $Y_0$ |
|   |   |   |   |   |   |   | X | X | X | X | X | X | X | X |   | $Y_1$ |
|   |   |   |   |   |   | X | X | X | X | X | X | X | X |   |   | $Y_2$ |
|   |   |   |   |   | X | X | X | X | X | X | X | X |   |   |   | $Y_3$ |
|   |   |   |   | X | X | X | X | X | X | X | X |   |   |   |   | $Y_4$ |
|   |   |   | X | X | X | X | X | X | X | X |   |   |   |   |   | $Y_5$ |
|   |   | X | X | X | X | X | X | X | X |   |   |   |   |   |   | $Y_6$ |
|   | X | X | X | X | X | X | X | X |   |   |   |   |   |   |   | $Y_7$ |
| Z | Z | Z | Z | Z | Z | Z | Z | Z | Z | Z | Z | Z | Z | Z | Z |   | bit, are at intervals which are equal to a bit length of each addend. Each of the first subset of bits is set to logic one;

For partial product rows in the multiplier which correspond to the first subset of bits, a portion of partial products in the partial product rows are forced to logic zero, so that addends for the tree addition are aligned in columns of the multiplier. The row reduction logic 12 and carry propagate addition 13 generate a result for the tree add, which is shifted to the left a number of bits equal to the bit length used by all addends less one.

Figure 4:
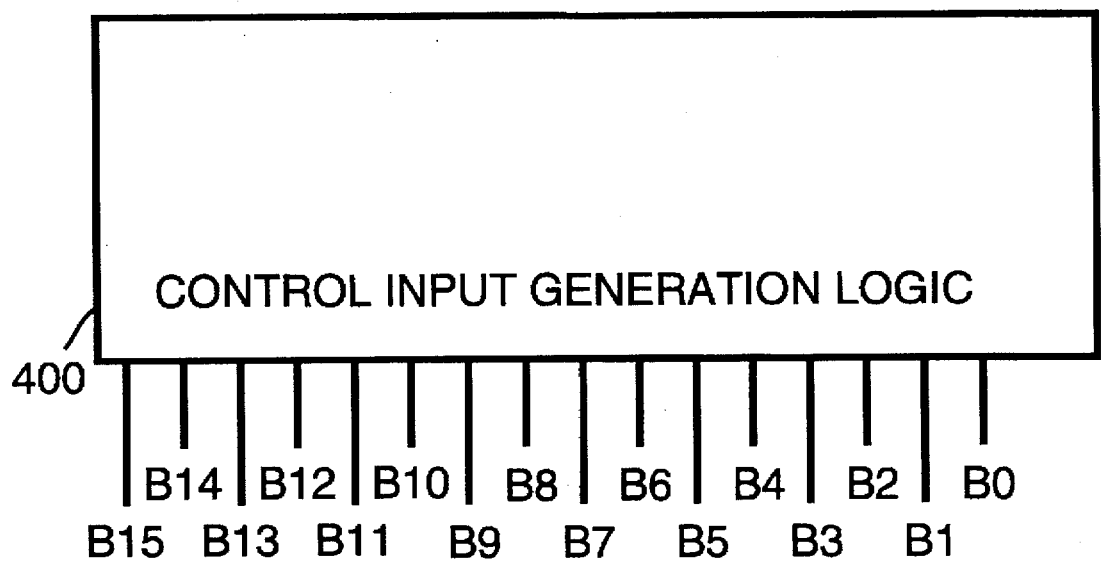
FIG. 4 shows a simplified block diagram of circuitry which generates control inputs used to generate partial products for a modified multiplier in accordance with the preferred embodiment of the present invention.

FIG. 4 shows control input generation 400 which generates control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$ for a tree add. Control input generation 400 generates control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$, for example, during register read-out time so that generation of the control inputs does not delay operations performed by the multiplier. In addition, control input generation may be used to generate control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$ for other operations such as a population count.

For example, in order to perform a tree add on two four-bit words, "abcd" and "efgh", using a modified eight-bit multiplier, the value "abcdefgh" is used in place of the first multiplicand $X_7X_6X_5X_4X_3X_2X_1X_0$(base 2). The value 00010001 is used in place of an eight-bit second multiplicand $Y_7Y_6Y_5Y_4Y_3Y_2Y_1Y_0$(base 2). For the top row, the control inputs for the four least significant bit positions are forced to logic zero. For the fifth row down, the control inputs for the most least significant bit positions are forced to logic zero. The row reduction logic 12 and carry propagate addition 13 generate a result for the tree add, which is shifted to the left four bits-the bit length of all addends (eight bits) less the bit length of one addend (four bits).

Table 5 below illustrates the use of a modified multiplier to perform this tree addition:

are forced to logic zero. For the thirteenth row down, the control inputs for the twelve most significant bit positions are forced to logic zero. The row reduction logic 12 and carry propagate addition 13 generate a result for the tree add, which is shifted to the left twelve bits-the bit length of all addends (sixteen bits) less the bit length of one addend (four bits).

Table 6 below illustrates the use of a modified multiplier to perform this tree addition:

TABLE 6

| | |
|---|---|
| abcdefghijklmnop | |
| abcd************ | 1 |
| 0000000000000000 | 0 |
| 0000000000000000 | 0 |
| 0000000000000000 | 0 |
| **efgh****** | 1 |
| 0000000000000000 | 0 |
| 0000000000000000 | 0 |
| 0000000000000000 | 0 |
| ******ijkl** | 1 |
| 0000000000000000 | 0 |
| 0000000000000000 | 0 |
| 0000000000000000 | 0 |
| ************mnop | 1 |
| 0000000000000000 | 0 |
| 0000000000000000 | 0 |
| 0000000000000000 | 0 |
| 000000000000ZZZZZZZZ00000000000 | |

In Table 6 above, each "*" indicates a value forced to logic zero by a control input. The result of the tree add is the value "ZZZZZZZ". In the result register, this value is shifted twelve bits to the left of the least significant bit.

In order to perform a tree add on two eight-bit words, "abcdefgh" and "ijklmnop," using a modified sixteen bit

TABLE 5

| | | | | | | | a | b | c | d | e | f | g | h | |
|---|---|---|---|---|---|---|---|---|---|---|---|---|---|---|---|
| | | | | | | | a | b | c | d | * | * | * | * | 1 |
| | | | | | | 0 | 0 | 0 | 0 | 0 | 0 | 0 | 0 | | 0 |
| | | | | | 0 | 0 | 0 | 0 | 0 | 0 | 0 | 0 | 0 | | 0 |
| | | | | 0 | 0 | 0 | 0 | 0 | 0 | 0 | 0 | 0 | | | 0 |
| | | | * | * | * | * | e | f | g | h | | | | | 1 |
| | | 0 | 0 | 0 | 0 | 0 | 0 | 0 | 0 | | | | | | 0 |
| | 0 | 0 | 0 | 0 | 0 | 0 | 0 | 0 | | | | | | | 0 |
| 0 | 0 | 0 | 0 | 0 | 0 | 0 | 0 | | | | | | | | 0 |
| 0 | 0 | 0 | 0 | 0 | 0 | 0 | Z | Z | Z | Z | Z | 0 | 0 | 0 | 0 |

In Table 5 above, each "*" indicates a value forced to logic zero by a control input. The result of the tree add is the value "ZZZZZ". In the result register, this value is shifted four bits to the left of the least significant bit.

In order to perform a tree add on four four-bit words, "abcd," "efgh," "ijkl," "mnop,"πusing a modified sixteen bit multiplier, the value "abcdefghijklmnop" is used in place of the first multiplicand. The value 0001000100010001 is used in place of a second multiplicand. For the top row, the control inputs for the twelve least significant bit positions are forced to logic zero. For the fifth row down, the control inputs for the eight least significant bit positions and the four most significant bit positions are forced to logic zero. For the ninth row down, the control inputs for the four least significant bit positions and the eight most significant bit positions multiplier, the value "abcdefghijklmnop" is used in place of the first multiplicand. The value 0000000100000001 is used in place of a second multiplicand. For the top row, the control inputs for the eight least significant bit positions are forced to logic zero. For the ninth row down, the control inputs for the eight most significant bit positions are forced to logic zero. The row reduction logic 12 and carry propagate addition 13 generate a result for the tree add, which is shifted to the left eight bits—the bit length of all addends (sixteen bits) less the bit length of one addend (eight bits).

Table 7 below illustrates the use of a modified multiplier to perform this tree addition:

TABLE 7

```
             abcdefghijklmnop
             abcdefgh********    1
             0000000000000000    0
             0000000000000000    0
             0000000000000000    0
             0000000000000000    0
             0000000000000000    0
             0000000000000000    0
             0000000000000000    0
             ********ijklmnop    1
             0000000000000000    0
             0000000000000000    0
             0000000000000000    0
             0000000000000000    0
             0000000000000000    0
             0000000000000000    0
             0000000000000000    0
```

00000000000000ZZZZZZZZZ00000000

In Table 7 above, each "*" indicates a value forced to logic zero by a control input. The result of the tree add is the value "ZZZZZZZ". In the result register, this value is shifted eight bits to the left of the least significant bit.

As will be understood by persons of ordinary skill in the art, as a variation on the present invention, any partial product with a value of logic zero may be generated using the control input for the partial product. For example, in order to perform a tree add on two eight-bit words, "abcdefgh" and "ijklmnop," using a modified sixteen bit multiplier, the value 1111111111111111 is used in place of a second multiplicand. For all rows except the top row and the ninth row, the control inputs are forced to logic zero. For the top row, the control inputs for the eight least significant bit positions are forced to logic zero. For the ninth row down, the control inputs for the eight most significant bit positions are forced to logic zero. The row reduction logic 12 and carry propagate addition 13 generate a result for the tree add, which is shifted to the left eight bits—the bit length of all addends (sixteen bits) less the bit length of one addend (eight bits).

Table 8 below illustrates the use of a modified multiplier to perform this tree addition:

TABLE 8

```
             abcdefghijklmnop
             abcdefgh********    1
             ****************    1
             ****************    1
             ****************    1
             ****************    1
             ****************    1
             ****************    1
             ****************    1
             ********ijklmnop    1
             ****************    1
             ****************    1
             ****************    1
             ****************    1
             ****************    1
             ****************    1
             ****************    1
```

00000000000000ZZZZZZZZZ00000000

In Table 8 above, each "*" indicates a value forced to logic zero by a control input. The result of the tree add is the value "ZZZZZZZZ". In the result register, this value is shifted eight bits to the left of the least significant bit.

The foregoing discussion discloses and describes merely exemplary methods and embodiments of the present invention. As will be understood by those familiar with the art, the invention may be embodied in other specific forms without departing from the spirit or essential characteristics thereof. For example, the partial products might be generated with logic equivalents of a three input logic AND gate or with a 2-to-1 multiplexor. Accordingly, the disclosure of the present invention is intended to be illustrative, but not limiting, of the scope of the invention, which is set forth in the following claims.

I claim:

1. A multiplier which also performs tree addition comprising:

partial product generation means for generating partial products for multiplication, the partial product generation means including zeroing means for forcing a subset of the partial products to zero when performing a tree addition; and, partial product sum means, coupled to the partial product generation means, for summing the partial products generated by the partial product generation means to produce a result.

2. A multiplier as in claim 1 wherein the partial product means comprises a plurality of three-input logic AND gates arranged in rows, each row of logic AND gates used to multiply all bits of a first multiplicand by a single bit of a second multiplicand during multiplication.

3. A multiplier as in claim 2 wherein the zeroing means comprises a control input to each of the three-input logic AND gates.

4. A multiplier as in claim 1 wherein the partial product sum means comprises:

row reduction logic, the row reduction logic reducing the partial products generated by the partial product generation means into two rows of partial products; and, logic which performs a functional equivalent of a carry propagate addition on the two rows of partial products to produce the result.

5. A multiplier as in claim 1 wherein when a tree add is to be performed on a plurality of addends:

a first value is input into the multiplier in place of a first multiplicand, the first value being a concatenation of the addends;

a second value is input into the multiplier in place of a second multiplicand, each bit of the second value being at logic zero except for a first subset of bits comprising bits of the second value which, starting from the low order bit, are at intervals which are equal to a bit length of each addend, each of the first subset of bits being set to logic one; and, for partial product rows in the multiplier which correspond to the first subset of bits, a portion of partial products in the partial product rows are forced to logic zero, so that addends for the tree addition are aligned in columns of the multiplier.

6. A multiplier as in claim 1 wherein when a tree add is to be performed on a plurality of addends:

a first value is input into the multiplier in place of a first multiplicand, the first value including the addends;

a second value is input into the multiplier in place of a second multiplicand, each bit of the second value being at logic zero except for a first subset of bits comprising bits of the second value which, starting from the low order bit, are at intervals which are equal to a bit length of each addend, each of the first subset of bits being set to logic one; and, for partial product rows in the multiplier which correspond to the first subset of bits, a portion of partial products in the partial product rows are forced to logic zero, so that addends for the tree addition are aligned in columns of the multiplier.

7. A multiplier as in claim 1 wherein when a tree add is to be performed on a plurality of addends:

a first value is input into the multiplier in place of a first multiplicand, the first value being a concatenation of the addends;

a second value is input into the multiplier in place of a second multiplicand, each bit of the second value being at logic one; and, a portion of the partial products in the multiplier are forced to logic zero, so that addends for the tree addition are aligned in columns of the multiplier.

8. A method for using a multiplier to perform a tree addition comprising the steps of:

(a) inputting a first value to the multiplier in place of a first multiplicand, the first value being a concatenation of addends upon which the tree addition is performed;

(b) inputting a second value to the multiplier in place of a second multiplicand, each bit of the second value being at logic zero except for a first subset of bits comprising bits of the second value which, starting with the low order bit, are at intervals equal to a bit length of each addend, each of the first subset of bits being set to logic one;

(c) for partial product rows in the multiplier which correspond to the first subset of bits, forcing to logic zero a portion of partial products in the partial product rows, so that addends for the tree addition are aligned in columns of the multiplier; and, (d) summing the partial products to produce a result.

9. A method as in claim 8 wherein in step (c) partial products are forced to zero by placing a zero on a control input of three-input logic AND gate used to generate the partial product.

10. A method as in claim 8 wherein step (d) includes the following substeps:

(d.1) reducing the partial products into two rows of partial products; and, (d.2) performing a functional equivalent of a carry propagate addition on the two rows of partial products to produce the result.

11. A method for using a multiplier to perform a tree addition comprising the steps of:

(a) inputting a first value to the multiplier in place of a first multiplicand, the first value including addends upon which the tree addition is performed;

(b) forcing a subset of the partial products to zero when performing a tree addition; and, (c) summing the partial products to produce a result.

12. A method as in claim 11 wherein in step (b) partial products are forced to zero by placing a zero on a control input of three-input logic AND gate used to generate the partial product.

13. A method as in claim 11 wherein step (c) includes the following substeps:

(c.1) reducing the partial products into two rows of partial products; and, (c.2) performing a functional equivalent of a carry propagate addition on the two rows of partial products to produce the result.

14. A method as in claim 11 wherein in step (a) the first value is a concatenation of the addends.

15. A method as in claim 11 additionally including the following step:

inputting a second value to the multiplier in place of a second multiplicand, each bit of the second value being at logic one.

16. A method as in claim 15 wherein in step (b) partial products are forced to zero by placing a zero on a control input of three-input logic AND gate used to generate the partial product.

* * * * *